June 29, 1965  H. R. ASK  3,191,567
CONTROL FOR HYDROFOIL CRAFT
Filed Sept. 24, 1962  4 Sheets-Sheet 1

INVENTOR
HENRY R. ASK
BY Donald F. Bradley
AGENT

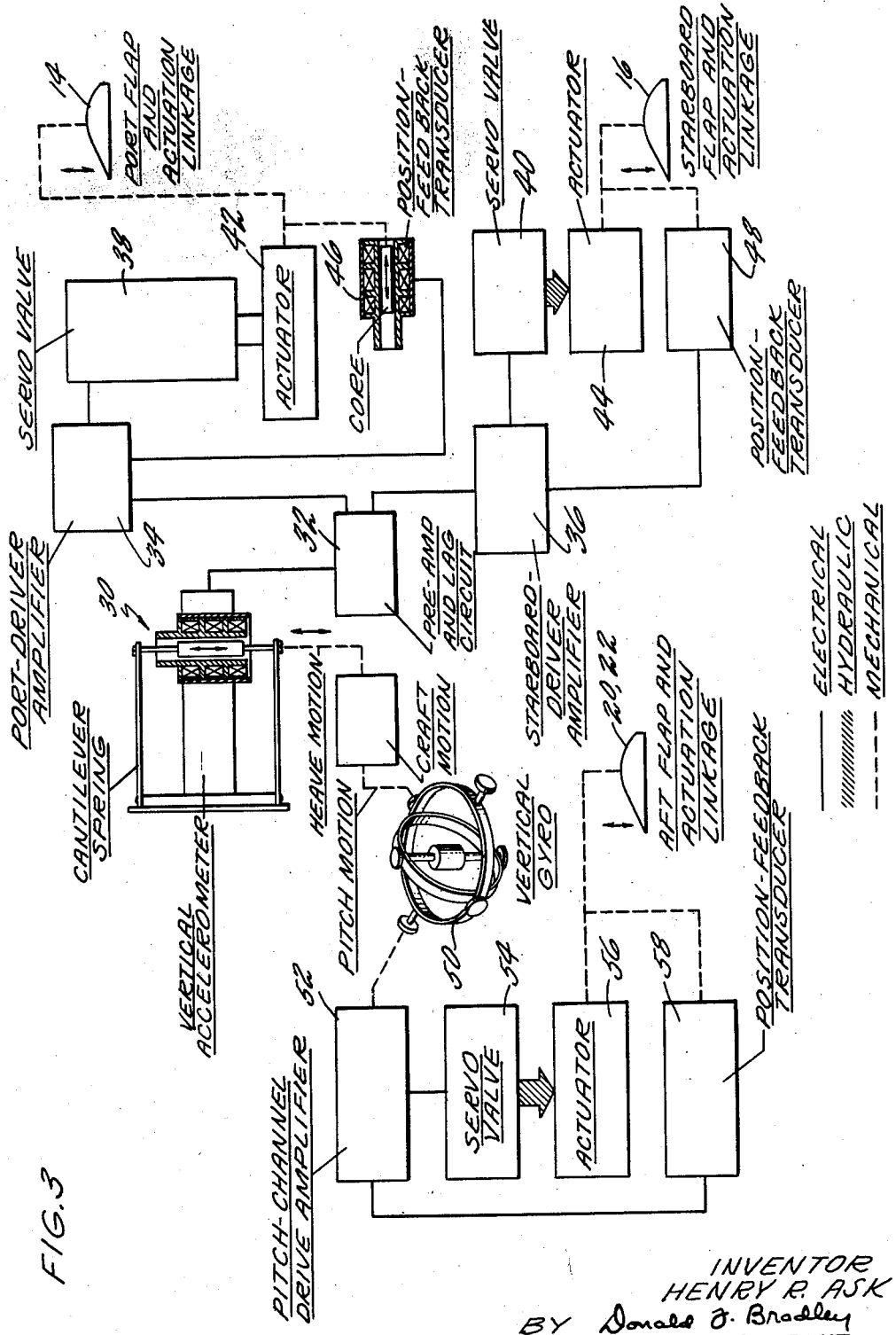

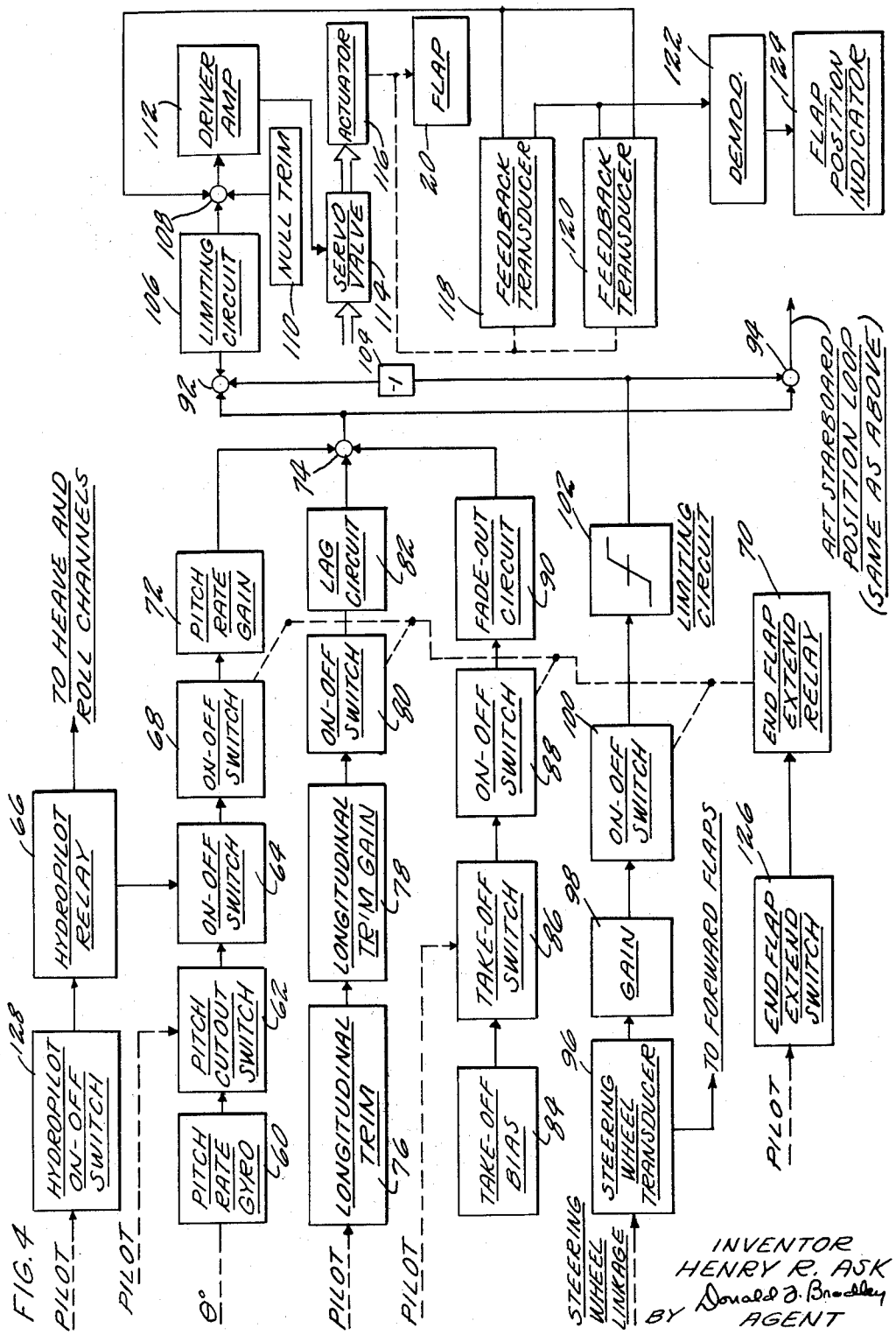

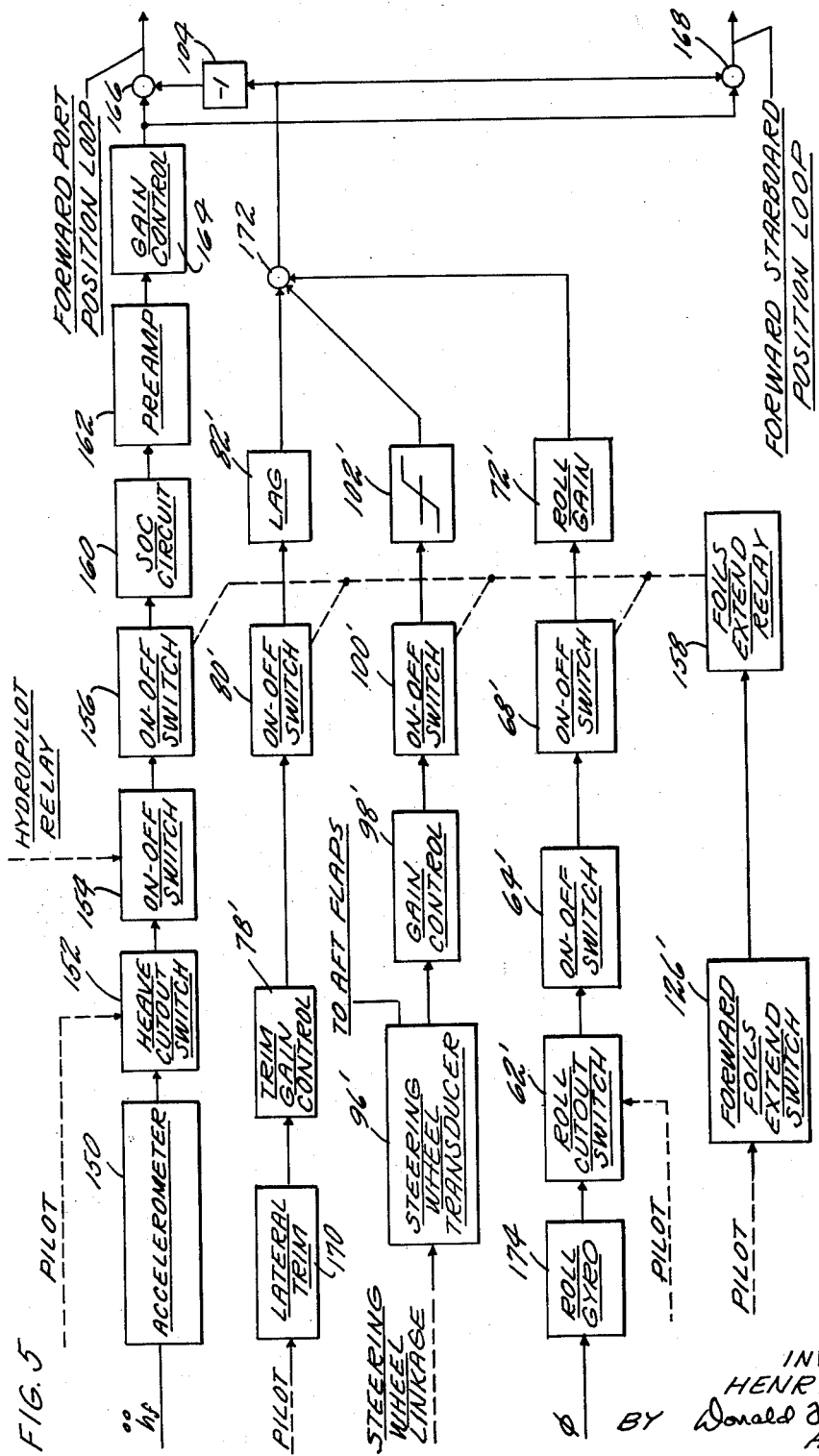

3,191,567
CONTROL FOR HYDROFOIL CRAFT
Henry R. Ask, Wapping, Conn., assignor to United Aircraft Corporation, East Hartford, Conn., a corporation of Delaware
Filed Sept. 24, 1962, Ser. No. 225,665
14 Claims. (Cl. 114—66.5)

This invention relates to a stability augmentation system for a hydrofoil craft, and particularly to a control system which will stabilize a surface-piercing type of hydrofoil craft in attitude and particularly in pitch, heave and roll.

Autopilots for the fully submerged foil type of hydrofoil craft are well known and described in the prior art. See for example my copending application Serial No. 207,881, entitled "Autopilot for Hydrofoil Craft," filed July 6, 1962. The fully submerged hydrofoil depends upon control surfaces or changes in angle of attack of the entire foil to produce changes in the lift coefficient. This type of craft, when used with an autopilot control system, is potentially capable of operating in open seas better than 90% of the time, and will produce a very smooth ride even at high speeds. The surface piercing type of hydrofoil has its foil essentially filed in attitude with respect to the hull of the craft and depends upon variations in area of the foil in water to supply added lift as needed, every change in the water surface being transmitted to the craft as a change in lift force because of the change in wetted foil area. The performance of a surface-piercing foil craft in a head sea is noticeably different from that in a following sea. The ride is consequently less smooth than in a fully-submerged foil craft, and the use of surface piercing foil craft is usually limited to inland waters or sheltered ocean areas.

This invention relates to a control system for a hybrid type of surface piercing hydrofoil craft which utilizes control surfaces to provide sea keeping augmentation. The hybrid surface piercing craft is capable of operating in moderate to heavy open sea conditions with augmentation and will perform without controls for less rigorous conditions. A surface piercing foil equipped vessel for which stability augmentation is provided will result in a significant improvement in sea-keeping ability, even though the vessel may have good inherent stability characteristics.

It is therefore an object of this invention to provide a stability augmentation system for a craft using surface piercing hydrofoils.

Another object of this invention is a control system for a surface piercing hydrofoil in which a fully submerged aft foil provides craft pitch control.

A further object of this invention is a control system for a surface piercing hydrofoil whereby heave and roll stabilization are augmented by flaps connected with a fixed forward foil.

Another object of this invention is a stability augmentation system for surface piercing hydrofoil craft in which a vertical gyro provides roll and pitch attitude reference and in which an accelerometer provides heave indications, tilting of the vertical gyro being compensated for by the mixing of gyro and accelerometer signals.

These and other objects and a fuller understanding of the invention may be had by referring to the following description and claims read in conjunction with the accompanying drawings which illustrate an embodiment of the invention.

FIGURE 3 is showing schematically a typical control system for providing craft longitudinal stability augmentation; and FIGURE 4 shows in block diagram form the control system for the aft foils; and FIGURE 5 shows in block diagram from the control system for the forward foils.

Figure 1:
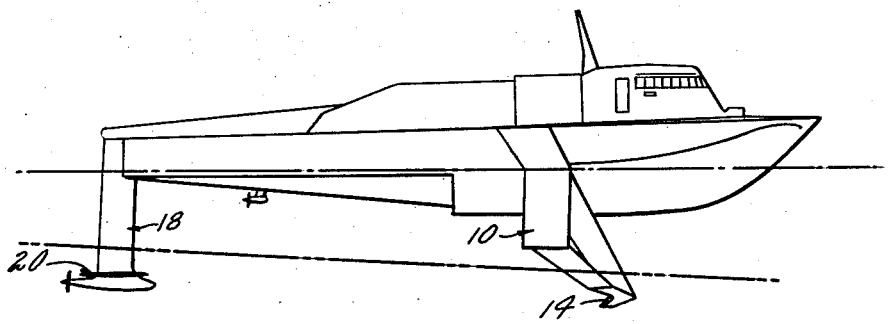
FIGURE 1 shows a typical craft incorporating a surface piercing hydrofoil.
Figure 2:
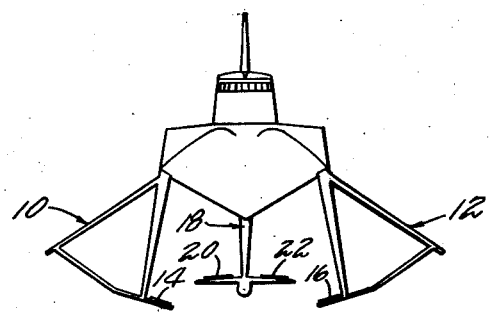
FIGURE 2 is a front view of the craft of FIGURE 1.

FIGURES 1 and 2 shows a typical craft having forward foils 10 and 12 attached to the craft. The foils are swept double dihedral assemblies with a portion of the lower foil section 14 and 16 flapped. Flaps 14 and 16 may be moved collectively, that is, both up or down together, or differentially, that is, one flap up and the other down. The aft foil assembly 18 is fully submerged. Incidence control of the aft foil is provided by making the entire foil rotatable or by using a pair of flaps similar to the elevator in aircraft. It will be assumed for purposes of illustration that aft foil 18 uses a pair of flaps 20 and 22, but it is obvious that a rotatable foil can also be used. Rotatable foils and flaps are well known in the art and will not be described in detail, since the exact location of the foils and flaps and the mechanism necessary to move the foils and flaps will vary with the particular craft. Background in this area will be found in the aircraft art, since the foil and flaps are analogous to the wings and control surfaces of aircraft.

FIGURE 3 shows, in simplified schematic form, the system composition for longitudinal stability augmentation of the craft. To stabilize the craft in heave, a vertical accelerometer 30 is used to sense heave accelerations. The heave acceleration signal is fed to an electronics network 32 which includes a preamplifier and lag circuit to remove undesirable inputs and to integrate the acceleration signal in approximate form. The processed signal is then fed to a pair of driver amplifiers 34 and 36 in the port and starboard of the craft. The amplifiers actuate servo valves 38 and 40, and actuators 42 and 44 are driven in response to the servo valves. The actuators drive the part and starboard flaps 14 and 16. Transducers 46 and 48 sense flap position and feed a signal back to the amplifiers to cancel the actuator input.

The pitching motions of the craft are sensed with a vertical gyro 50. The gyro output signal is fed to an amplifier 52 which processes the gyro signal and drives servo valve 54 into the aft foil position servo loop. As in the forward servo loop, the servo valve drives an actuator 56 which mechranically drives the aft flaps 20 and 22 until the sensed flap position signal feedback from transducer 58 cancels the input. The aft flaps thus move collectively to stabilize the craft in pitch only.

The simplified system described above utilizes heave rate as the basic feedback signal to the forward flaps and pitch or pitch rate to the aft foil or flaps. In order to take full advantage of the forward flap actuator implementation, the system may readily be expanded to provide augmentation in roll also. This is done by actuating the forward flaps differentially in response to processed roll error as sensed by the vertical gyro used also for pitch control. In addition, yaw rate as sensed by a separate rate gyro or by differentiating a heading signal may be fed to the forward flaps to cause the craft to bank into a turn for increased maneuverability.

While the system described above is quite sophisticated since it performs a number of functions, it is possible that only a single axis control would be used for simplicity and economy. Studies and experimentation have shown that substantial longitudinal performance gains are possible with single axis foil or flapped foil control alone. However, further improvement in craft foil-borne capabilities can be gained by using forward and aft flap control. The amplitude of oscillations in pitch and heave to regular waves is reduced by more than a factor of two over the results obtained by rear flap control alone. This has the effect of reducing the maximum vertical accelerations by approximately the same amount.

A number of combinations of signals were attempted to determine which signals and/or their derivatives should be applied to the respective flaps. It is apparent from the foil configuration that pitch control is best implemented using the aft flaps and heave control through the forward flaps. It is not apparent whether the parameter or its derivatives or some combination thereof is optimum.

For pitch control, either pitch error or pitch rate feedback may be used at the rear foil. The two signals applied simultaneously exhibit little improvement over one or the other. Pitch error is preferred since it appears advantageously to have a vertical reference to thereby establish a desired trim. This, however, requires a vertical gyro instead of a rate gyro.

For heave stabilization it is apparent that heave rate feedback to the forward flaps is the optimum method. The application of heave rate summed with pitch error on the rear foils, in addition to heave rate feedback on the forward foils, was attempted but it was found to have a destabilizing effect on pitch.

To achieve optimum loop gain for pitch and heave rate, gain variation as a function of craft speed is required since the dynamic flap loading is a function of the square of the velocity. Also, the gain of the heave rate loop is relatively independent of the wave length of the sea waves, while the pitch error loop gain drops off from optimum performance in shorter waves.

FIGURE 4 shows in detail the pitch rate and steering channel for actuating the aft flaps of a hydrofoil craft. Referring to the figure, there are four aft flap biasing functions, one of which is automatic and the remainder are manual. The automatic function is pitch rate feedback as sensed by a pitch rate gyro 60. Since pitch rate is used here, it is obvious that the pitch rate could also be derived by using a vertical gyro and differentiating its output. The pitch rate signal passes through on-off switch 62 which is pilot operated and which will disconnect the individual pitch rate channel without affecting the rest of the system. Assuming switch 62 is "on," the pitch rate signal then passes through another on-off switch 64 which is controlled by hydropilot relay 66 operated by the pilot and which is the system master on-off switch. The pitch rate signal then passes to another on-off switch 68 which is actuated by aft flap extend relay 70. The relay 70 is only included in a flapped foil system, and then only if the flaps are retractable, that is, are similar to aircraft flaps which may be retracted when not in use. The relay 70 turns switch 68 "on" only when the flaps have been fully extended by mechanism not shown.

The pitch rate signal is then fed to an adjustable gain control 72, where the gain is manually or automatically controlled from zero to two times nominal. The signal is then summed at point 74 with the other manual trim inputs to be described.

A pilot operated manual longitudinal trim 76, preferably a potentiometer, feeds a bias signal to the aft flaps through a trim gain adjustment 78 and an on-off switch 80, the switch being actuated by the aft flap extend relay 70. An electrical lag of, for example, 5 seconds is applied to the trim signal by lag circuit 82. The lag circuit may be that described in U.S. Patent No. 3,052,857. The pair of aft flaps is trimmed collectively rather than each flap being trimmed individually because individual trim of each flap can cause a substantial net torque about the yaw axis unless care is taken to trim each flap pair by the same amount collectively or differentially. The electrical lag is induced to minimize pilot induced transients. The longitudinal trim signal is summed at point 74 with the pitch rate feedback signal.

An aft flap takeoff bias signal is provided by means of an adjustable network 84. This signal biases the aft flaps between 0° to 20° to thereby provide transient lift forces to break the craft loose on takeoff. The signal passes through the aft takeoff switch 86 and through aft foil extend relay on-off switch 88. A fade-out circuit 90, internally adjustable between 3 to 5 seconds, is connected in the circuit to prevent the rapid removal of the large takeoff bias immediately after lift-off and thus prevent longitudinal transients which might result in a crash. The application of a rapid aft flap bias prior to lift-off produces no problems. The takeoff bias signal is also summed at point 74.

After the pitch rate, longitudinal trim and takeoff bias signals have been summed, the summed signal is fed to two additional summing points 92 and 94 where it is combined with a signal from the craft steering wheel. Movement of the steering wheel by the pilot of the craft produces a signal from the steering wheel transducer 96. The signal passes through a gain adjustment 98, the aft foil extend relay on-off switch 100, and a limiting circuit 102 which limits the authority of the steering wheel.

The steering wheel is limited in its control because any time that collective and differential signals are summed at any set of control surfaces, the possibility of performance degradation of one channel due to another channel becomes manifested. For example, if the pilot has the capability of saturating the flaps differentially with a steering command, the effectiveness of the heave, pitch and roll stability augmentation will be markedly reduced during the saturated period. With the port flap fully down and the starboard flap fully up, a heave or pitch rate feedback signal would tend to take one flap out of saturation and drive the other further into saturation. The net result of this is asymmetric heave or pitch rate stabilizing forces causing transient roll torques due to flap repositioning on one side only. Thus, authority limits are placed on the steering signal inputs and are adjustable from ±10° to ±20° of flap angle fore and aft.

The steering signal is phase inverted at block 104 for one control loop and summed at each flap position loop input 92 and 94 with the composite signal from the other stabilizing and trim functions.

Since the two position loops are identical, only one loop will be described in detail, it being understood that two such loops are necessary. The net signal at each position loop input 92 and 94 is limited by means of an adjustable limiting circuit 106 and then fed to another summing point 108 where it is summed with a null trim adjustment circuit 110 and feedback transducer signals. The null trim circuit 110 is merely a trim for the flaps and is limited to ±3°. The error signal is amplified and demodulated by the driver amplifier 112 to drive an electrohydraulic servo valve 114. The servo valve directs the hydraulic flow to the actuator 116, which is mechanically linked to its respective flap 20. Feedback transducers 118 and 120 are mechanically linked to flap 20, and the transducers feed a signal back to the driver amplifier 112 input at summing point 108 to be compared with the sum of the input and null signals. The feedback transducer outputs are arranged so that the loss of one signal at the driver input results only in a 50% drop in closed loop frequency response and a doubling of the channel gain, and only a minor degradation in performance.

The output signals from the two feedback transducers 118, 120 are summed and demodulated at 122 to drive a flap position indicator 124. Although not shown, it is obvious that power supplies for the transducers and other units, as well as amplifiers, may be required in the system.

Aft flap extend relay 70 is operated by the pilot by means of an aft flap extend switch 126, and similarly hydropilot on-off switch 128, operated by the pilot, actuates hydropilot relay 66.

FIGURE 5 shows in block diagram form a complete control system for the forward flaps 14 and 16. The input signals to the forward flaps consist of a heave rate feedback, a manual lateral trim signal, and a crossfed steering signal. A separate roll signal is also provided for stability.

Referring to FIGURE 5, signals proportional to forward vertical accelerations are sensed by accelerometer 150 and fed through a pilot operated heave rate cutout switch 152, which will eliminate the accelerometer input. The signal is then fed through the hydropilot on-off switch operated by the hydropilot relay, and a forward foil extend on-off switch 156 operated by a forward foil extend relay 158, the extend switch being "on" only when the forward foils are fully extended and in operating position. The signal is then processed to remove the effects of sensed gravity coupling and integrated in approximate form by means of Standard Operating Circuit (SOC) 160. SOC circuit 160 is described in detail in my copending application Serial No. 207,881. Briefly, the purposes of the SOC circuit 160 are to eliminate accelerometer null shift problems, reduce sensed low frequency accelerations due to sustained turns, and to integrate accelerations in approximate form to rate signals. Rate and accelerometer feedback gains are such that even good quality seismic mass accelerometers have null shifts which can cause undesirable steady bias signals to their respective control surfaces. The use of the rate-lag circuit eliminates this problem. The accelerometer output signal is rate-lagged and integrated in approximate form to a vertical velocity. The two signals ($h$ and $\dot{h}$) are summed and gain controlled to set in the correct proportion of rate and acceleration gains for optimum performance. The lag is adjustable between, for example, 3 to 7 seconds.

The signal is then preamplified at 162 as needed, gain controlled by adjustable gain circuit 164, and then summed at the forward position servo loops 166 and 168.

The manual lateral trim signal from block 170 and the crossfed steering signals are processed as described in FIGURE 4 except that both signals are first summed at point 172 and then phase inverted to position loop 166 and fed directly to the other position loop 168. The net signal to each position feedback loop is limited and applied to the driver amplifier inputs.

The roll feedback channel is identical to the pitch rate feedback channel with one exception, namely, the roll signal from proportional roll gyro 174 must be summed with the lateral bias signals at 172 and then applied differentially to the position loops.

The reference numerals applied to FIGURE 5 which have the same numbers as FIGURE 4 indicate that the same type of circuit may be used.

Although the roll signal shown in FIGURE 5 is described as a proportional roll signal, it is apparent from previous comments that roll rate may also be used. Further, under certain maneuvering conditions, the roll rate signal may need to be "washed out." Adequate turning performance necessitates a fast differential flap response when a rudder command is given. If a high gain roll rate signal is summed directly with the steering crossfeed, the roll rate will buck the steering command signal. When a substantial steering command is given, the result can be a tendency to roll out initially, in addition to being less responsive to steering commands. To retain a high roll rate gain for adequate stability for all sea conditions and still have a responsive steering system, a roll rate washout may be used. This is accomplished by sensing steering wheel rate, intentionally lagging the rate signal, and using the resultant signal to reduce the roll rate signal amplitude. An internal adjustment may be provided to change the washout duration.

It is to be understood that the invention is not limited to the specific embodiment herein illustrated and described, but may be used in other ways without departure from its spirit as defined by the following claims.

I claim:
1. A control system for a water vehicle comprising a pair of fixed surface piercing foils connected with said vehicle and adapted to inherently provide lift to said vehicle, the amount of lift automatically varying in proportion to the area of the foils in water to thereby stabilize said vehicle, control surface means including movable flaps attached to each said foil, sensor means connected with said vehicle for producing a heave control voltage indicative of vertical accelerations of said vehicle, and means responsive to said control voltage for actuating said flaps collectively and damping the heave of said vehicle.

2. A control system as in claim 1 including additional sensor means connected with said vehicle for producing a roll control voltage indicative of the roll of said vehicle, and means responsive to said roll voltage for actuating said flaps differentially to thereby damp the rolling motions of said vehicle.

3. In a control system for a water vehicle, a pair of fixed surface piercing foils connected with said vehicle to inherently provide lift to said vehicle, the amount of lift automatically varying in proportion to the area of the foils in water, having first control surface means connected with each of said surface piercing foils and responsive to vehicle vertical accelerations to provide motion damping of said vehicle in heave, pitch control means for said vehicle comprising a second fully submerged foil, said second foil having second control surface means, sensor means for sensing pitching motions of said vehicle and producing a pitch control signal, servo means responsive to said pitch control signal for actuating said second control surface means, and steering means for said vehicle for actuating both said first and second control surface means.

4. In a water vehicle having a fixed surface-piercing foil connected with said vehicle to provide lift thereto, the lift of said vehicle being proportional to the area of said foil in water whereby said vehicle has an inherent equilibrium-seeking characteristic, seakeeping augmentation means for said vehicle comprising a pair of control flaps connected with said fixed foil, actuating means for said flaps, heave sensing means including an accelerometer connected with said vehicle and producing a heave voltage proportional to vehicle heave, means connecting said heave voltage with said actuating means to move said flaps collectively in a direction to reduce said heave signal, steering means connected with said vehicle, means responsive to said steering means for producing a steering voltage, additional means connected with said vehicle for sensing vehicle roll and producing a roll voltage, and means for connecting said steering voltage and said roll voltage to said actuating means to move said flaps differentially.

5. Seakeeping augmentation means for a water vehicle as in claim 4 and including means to limit the authority of said steering voltage to thereby prevent saturation of said pair of control flaps.

6. Seakeeping augmentation means for a water vehicle as in claim 4 and including a fully submerged foil having a second pair of flaps connected therewith, actuating means for said second flaps, means connected with said vehicle for sensing vehicle pitch and producing a pitch voltage and means connecting said pitch voltage with said second flap actuating means to move said second flaps collectively in a direction to reduce said pitch voltage.

7. Stability augmentation means for a water vehicle as in claim 6 and including a biasing voltage for collectively moving said second flaps in a direction to provide added lift to said vehicle, means for selectively applying said biasing voltage to said actuating means, and fadeout circuit means for preventing the rapid removal of said biasing voltage.

8. Stability augmentation means for a water vehicle as in claim 6 in which said steering voltage is applied to said actuating means for said second flaps to move said second flaps differentially.

9. A water vehicle having a fixed surface-piercing foil with the lift of said vehicle automatically varying as a function of the area of said foil in water whereby the vehicle has an inherent equilibrium-seeking characteristic, a first control surface connected with said fixed foil, additional lifting means including a fully submerged foil, a second control surface connected with said sumberged foil, means for sensing vehicle motions in pitch, heave and roll and producing voltage signals proportional thereto, means responsive to said vehicle pitch and roll voltage signals for actuting said vehicle second control surface, and means responsive to said vehicle heave and roll voltage signals for actuating said vehicle first control surface.

10. A water vehicle as in claim 9 in which each of said first and second control surfaces includes a pair of flaps connected with each respective foil.

11. A water vehicle as in claim 10 in which said vehicle heave and pitch voltage signals respectively actuate said vehicle first and second pairs of flaps collectively, and in which said vehicle roll voltage signal actuates said first and second pair of flaps differentially.

12. A water vehicle as in claim 11 and including steering means for said vehicle producing a steering voltage, and means responsive to said steering voltage for actuating both said pairs of flaps differentially.

13. A water vehicle as in claim 12 and including circuit means for limiting the movement of said flaps in response to said steering voltage to thereby prevent saturation of said flaps.

14. A water vehicle as in claim 13 and including a biasing voltage for selectively actuating said second pair of flaps collectively in a direction to provide added lift to said vehicle, and means for preventing rapid return of said flaps upon removal of said biasing means voltage.

References Cited by the Examiner
UNITED STATES PATENTS

| | | | |
|---|---|---|---|
| 2,550,220 | 4/51 | Bussei | 114—66.5 |
| 2,749,871 | 6/56 | Scherer et al. | 114—66.5 |
| 2,771,051 | 11/56 | Von Schertel | 114—66.5 |
| 2,844,338 | 7/58 | Keith | 244—775 |
| 2,944,768 | 7/60 | Weber | 244—77 |
| 2,958,031 | 10/60 | Taylor et al. | 244—77 X |
| 2,991,747 | 7/61 | Bader et al. | 114—66.5 |
| 3,055,331 | 9/62 | Singelmann | 114—66.5 |
| 3,081,728 | 2/63 | Wilterdink et al. | 114—66.5 |
| 3,137,260 | 6/64 | Harris et al. | 114—66.5 |

MILTON BUCHLER, *Primary Examiner*.

FERGUS S. MIDDLETON, *Examiner*.

UNITED STATES PATENT OFFICE
CERTIFICATE OF CORRECTION

Patent No. 3,191,567

June 29, 1965

Henry R. Ask

It is hereby certified that error appears in the above numbered patent requiring correction and that the said Letters Patent should read as corrected below.

Column 6, line 58, for "sugmentation" read -- augmentation --; column 7, line 9, for "sumberged" read -- submerged --; line 13, for "actuting" read -- actuating --; column 8, line 9, strike out "means".

Signed and sealed this 16th day of November 1965.

(SEAL)
Attest:

ERNEST W. SWIDER
Attesting Officer

EDWARD J. BRENNER
Commissioner of Patents